(12) United States Patent
Li et al.

(10) Patent No.: US 8,019,877 B2
(45) Date of Patent: Sep. 13, 2011

(54) METHOD, SYSTEM, SERVER AND TERMINAL FOR PROCESSING MESSAGE

(75) Inventors: Kepeng Li, Shenzhen (CN); Xiaoqian Chai, Shenzhen (CN); Linyi Tian, Shenzhen (CN); Fujun Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/493,385

(22) Filed: Jun. 29, 2009

(65) Prior Publication Data

US 2009/0265471 A1 Oct. 22, 2009

Related U.S. Application Data

(63) Continuation of application No. PCT/CN2008/071296, filed on Jun. 13, 2008.

(30) Foreign Application Priority Data

Jul. 24, 2007 (CN) .......................... 2007 1 0075289

(51) Int. Cl.
*G06F 15/16* (2006.01)
(52) U.S. Cl. ......... 709/227; 709/248; 709/223; 709/203
(58) Field of Classification Search .................. 709/223, 709/248, 227–228
See application file for complete search history.

(56) References Cited

U.S. PATENT DOCUMENTS

| 7,155,521 B2 * | 12/2006 | Lahti et al. ..................... 709/227 |
| 2003/0204640 A1 | 10/2003 | Sahinoja et al. |
| 2006/0133335 A1 | 6/2006 | Garcia-Martin |
| 2006/0218288 A1 * | 9/2006 | Umezawa et al. ............ 709/228 |
| 2007/0027971 A1 * | 2/2007 | Marolia et al. ................ 709/223 |
| 2007/0093243 A1 * | 4/2007 | Kapadekar et al. ........... 455/419 |

(Continued)

FOREIGN PATENT DOCUMENTS

JP 2001169341 6/2001

(Continued)

OTHER PUBLICATIONS

Open Mobile Alliance LTD: "OMA Device Management Protocol Approved Version 1.2" Feb. 9, 2007; pp. 1-54.

(Continued)

*Primary Examiner* — Salad Abdullahi
(74) *Attorney, Agent, or Firm* — Finnegan, Henderson, Farabow, Garrett & Dunner LLP (57) ABSTRACT

A method, a system, a server, and a terminal for processing message are described. The method includes the steps as follows. A notification message for requesting to establish a session sent by a session requester is received, in which the notification message carries session management information related to the session. The session management information of the session in the notification message is acquired, and a session connection with the session requester is initiated according to the session management information. Alternatively, the notification message is acknowledged according to the session management information, a reply message is generated according to an acknowledgement result, and the reply message is sent to the session requester. In embodiments of the present invention, a Data Synchronization (DS)/Device Management (DM) server determines problems of the sent notification message according to the information returned from the terminal, so as to perform the further processing, thereby preventing the DS or DM server from blindly and repeatedly sending the notification message when not being informed that a session connection is established by a DS or DM terminal.

19 Claims, 5 Drawing Sheets

U.S. PATENT DOCUMENTS

| | | | |
|---|---|---|---|
| 2007/0250614 A1* | 10/2007 | Szabo | 709/223 |
| 2008/0189419 A1* | 8/2008 | Girle et al. | 709/227 |
| 2008/0261631 A1* | 10/2008 | Nath et al. | 455/466 |

FOREIGN PATENT DOCUMENTS

| | | |
|---|---|---|
| JP | 2001298488 | 10/2001 |
| JP | 2002533023 | 10/2002 |
| JP | 2005505990 | 2/2005 |
| JP | 2007116682 | 5/2007 |
| WO | WO 2005/004395 A1 | 1/2005 |
| WO | WO2005003989 A1 | 1/2005 |
| WO | WO2005102017 A2 | 11/2005 |
| WO | WO2006018707 A1 | 2/2006 |
| WO | WO-2006/022578 | 3/2006 |
| WO | WO-2007/001121 | 1/2007 |

OTHER PUBLICATIONS

Open Mobile Alliance LTD: "OMA Device Management Representation Protocol Approved Version 1.2" Feb. 9, 2007; pp. 1-48.

Written Opinion of the International Searching Authority (translation) dated (mailed) Oct. 9, 2008, issued in related application No. PCT/CN2008/071296, filed Jun. 13, 2008, Huawei Technologies Co., Ltd.

EP Communication—Supplementary European Search Report dated Aug. 4, 2010, issued in related European application No. 08757707.8, Huawei Technologies Co. Ltd.

OMA, DS Protocol—Approved Version 1.2; Open Mobile Alliance, OMA-TS-DS_Protocol-V1_2-20060710-A, Jul. 2006, 90 pages.

OMA, OMA Device Management Notification Initiated Session—Approved Version 1.2; Open Mobile Alliance, OMA-TS-DM_Notification-V1_2-20070209-A, Feb. 2007, 16 pages.

OMA, SyncML Server Alerted Notification—Approved Version 1.2; Open Mobile Alliance, OMA-TS-SyncML_SAN-V1_2-20070221-A, Feb. 2007, 17 pages.

First Chinese Office Action dated (mailed) Jan. 4, 2011, issued in related Chinese Application No. 200710075289.3 Huawei Technologies Co., Ltd.

"OMA Device Management Representation Protocol," Approved Version 1.2, Open Mobile Alliance Ltd., Feb. 2007.

Korean Office Action dated (mailed) Nov. 23, 2010, issued in related Korean Application No. 10-2009-7013229 Huawei Technologies Co. Ltd.

Japanese Office Action dated (mailed) Mar. 22, 2011, issued in related Japanese Application No. 2009549764, Huawei Technologies Co. Ltd.

* cited by examiner

METHOD, SYSTEM, SERVER AND TERMINAL FOR PROCESSING MESSAGE

CROSS-REFERENCE TO RELATED APPLICATIONS

This application is a continuation of International Application No. PCT/CN2008/071296, filed on Jun. 13, 2008, which claims the benefit of Chinese Patent Application No. 200710075289.3, filed on Jul. 24, 2007. The contents of the above identified applications are incorporated herein by reference in their entirety.

FIELD OF THE TECHNOLOGY

The present invention relates to a communication technology, and more particularly, to a method, a system, a server, and a terminal for processing message.

BACKGROUND

A Device Management (DM) technology refers to that a server performs management operations, such as parameter configuration, firmware update, software download, installation, and deletion, fault diagnosis and repairing, and terminal monitoring, on a terminal in an Over The Air (OTA) manner. A Data Synchronization (DS) technology refers to that the data is synchronized between a mobile device and a network server, and the synchronized data includes a telephone book, an address book, a calendar, short messages, mails and so on.

In the prior DM technology or DS technology, a notification mechanism is provided, by which the server delivers a notification message to the terminal device, and the terminal device initiates a session connection with the server according to a session identifier (ID), a server ID, and other information in the notification. The notification message is delivered in a short message or a pushing manner. The DM specification provides a mechanism for the DM server to manage the terminal device, and referring to FIG. 1, the session management flow includes the steps as follows.

Figure 1:
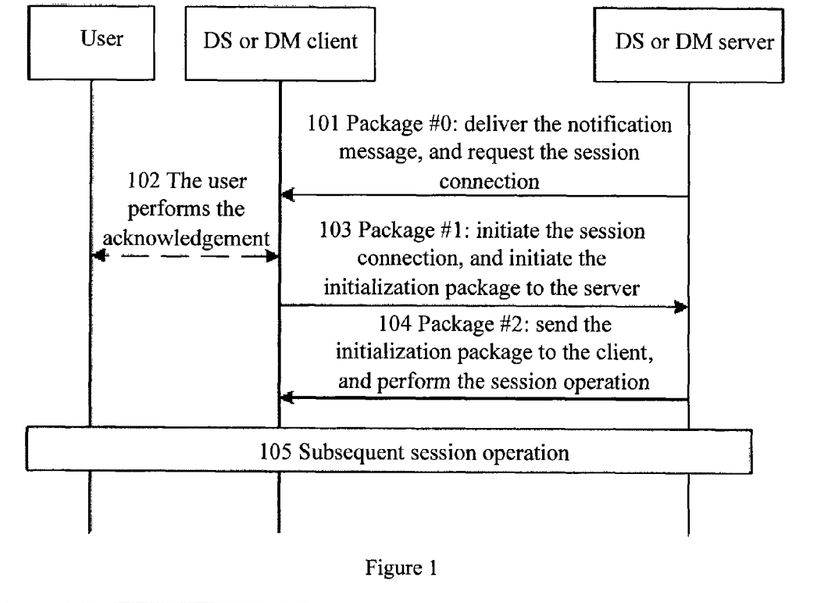
FIG. 1 is a flow chart of session management in the prior art, in which a DS or DM terminal receives a notification message sent by a notification server and processes the notification message.

In Step 101, a DS or DM server delivers a notification message for requesting a session connection.

In Step 102, after a terminal receives the notification message, a user directly acknowledges whether to connect the session, and if the acknowledgement result is to connect the session, the procedure proceeds to Step 103; otherwise, the terminal does not perform any processing.

In Step 103, the terminal initiates the session connection, and sends an initialization package to the server for performing the session flow.

In Step 104, after receiving the initialization package for initiating the session connection sent by the terminal, the server sends the initialization package to the terminal for performing the session operation.

In Step 105, the terminal and the server perform the subsequent session flow.

Based on the above mentioned prior art, the inventor finds that some problems may be occurred during the practical operation process in the invention process: after receiving the notification message from the server, the terminal lacks of a replying mechanism, so that the server cannot obtain the feedback of the terminal, and continuously and repeatedly sends the notification message, thus increasing the processing workload of the server and increasing the occupied network resource.

SUMMARY

Accordingly, in embodiments of the present invention, by expanding a DS or DM notification message, more session management information may be carried in the DS or DM notification message, a DS or DM terminal analyzes and determines the notification message, and sends a reply message to a DS or DM server according to an analysis and determination result, so that the DS or DM server further performs the processing according to information returned from the DS or DM terminal.

The embodiments of the present invention provide a method including the steps as follows.

A notification message for requesting to establish a session sent by a session requester is received, and the notification message carries session management information related to the session.

The session management information related to the session in the notification message is acquired, and a session connection with the session requester is initiated according to the session management information. Or, the notification message is acknowledged according to the session management information, a reply message is generated according to an acknowledgement result, and the reply message is sent to the session requester.

The embodiments of the present invention further provide a DS or DM terminal, which includes:

a notification message receiving module, adapted to receive a notification message sent by a session requester, in which the notification message carries session management information;

a session determining module, adapted to acquire the session management information, and acknowledge the notification message according to the session management information;

a reply message generating module, adapted to generate a reply message according to an acknowledgement result of the session determining module;

a reply message sending module, adapted to send the reply message generated by the reply message generating module to the notification message sender in a bearer form of the notification message according to the determination of the session determining module; and a message transceiving module, adapted to send the reply message generated by the reply message generating module to the session request sender, or adapted to initiate a session connection with the session requester according to the acknowledgement result of the session determining module.

The embodiments of the present invention further provide a system for processing a message, which is applicable to a DS or DM session, and includes:

a DS or DM server, adapted to send a notification message for requesting to establish a session to a terminal, receive a reply message of the notification message, and perform a corresponding processing according to the content carried in the received reply information, in which the notification message carries the session management information.

The embodiments of the present invention further provide a DS or DM server, which includes:

a session notification message initiating module, adapted to send a notification message for requesting to establish a session to a DS or DM terminal;

a reply message receiving module, adapted to receive a replay message returned from the DS or DM terminal; and a processing module, adapted to perform a corresponding processing according to the content carried in a reply message.

The embodiments of the present invention further provide a method including the steps as follows.

A notification message for requesting to establish a session is sent to a terminal, in which the notification message carries session management information related to the session.

A reply message returned from the terminal according to the session management information is received.

A corresponding processing is performed according to information carried in the reply message.

It may be known from the technical solutions mentioned above that in the method, after the notification message for requesting the session connection delivered by the DS or DM server is received, according to the analysis, determination, and authentication results of the form and the content of the message, the reply message is sent to the DS or DM server, so that the server may determine the problems of the sent notification according to the information returned from the DS or DM terminal, so as to perform the further processing. Therefore, the DS or DM server may be prevented from blindly and repeatedly sending the notification message when not being informed that a session connection is established by the DS or DM terminal. Moreover, the terminal knows the importance and the purpose of the session in advance, so as to decide whether to perform the session, and notify the server by the reply message when the session is rejected, thereby preventing the server from repeatedly sending the notification message.

DETAILED DESCRIPTION

Embodiments of the present invention provide a method for processing message, which is applicable to a DS or DM session. In the method, after a notification message for requesting a session connection delivered by a DS or DM server is received, according to analysis, determination, and authentication results of a form and content of the message, a reply message is sent to the DS or DM server, so that the server may determine the problems of the sent notification according to the information returned from the DS or DM terminal, for performing the further processing, thereby preventing the DS or DM server from blindly and repeatedly sending the notification message when not being informed that a session connection is established by the DS or DM terminal. Furthermore, the terminal knows the importance and the purpose of the session in advance, so as to decide whether to perform the session, and notify the server by the reply message when the session is rejected, thereby preventing the server from repeatedly sending the notification message.

Figure 2:
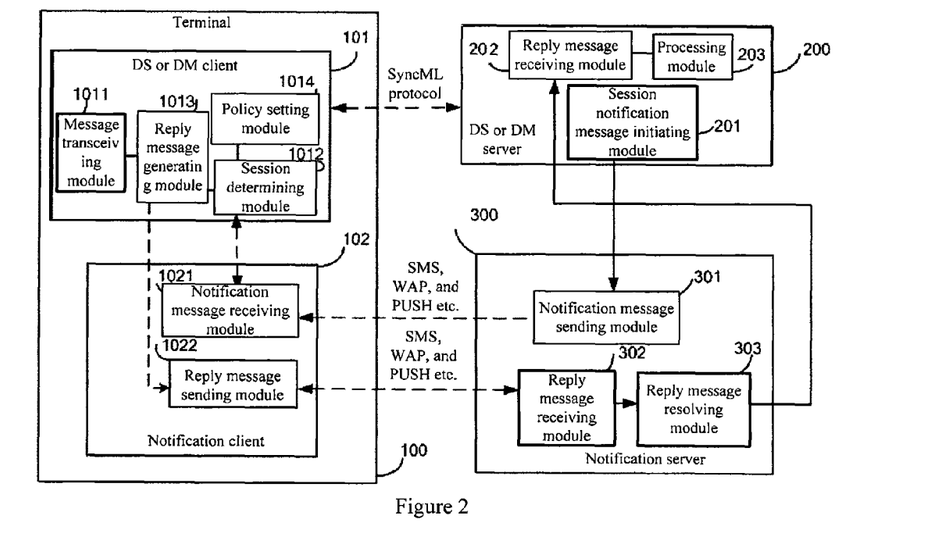
FIG. 2 is a schematic structural view of a system for processing a message provided in an embodiment of the present invention.

In order to realize the method, the embodiments of the present invention provide a system for processing message. As shown in FIG. 2, a schematic structural view of the system according to the present invention is shown, which includes a terminal 100 and a server side. The terminal mainly includes a DS or DM client 101 (which may be a DM client, a DS client, or may include the DM and the DS clients, and the description is the same thereafter) and a notification client 102. The server side mainly includes a DS or DM server 200 and a notification server 300.

In the embodiments of the present invention, the DS or DM client 101 interacts with the DS or DM server 200 by a DS or DM protocol, and the DS or DM client 101 includes a message transceiving module 1011, a session determining module 1012, and a reply message generating module 1013.

The message transceiving module 1011 is adapted to receive a DS or DM session message sent by the DS or DM server, and send the DS or DM session message generated by the reply message generating module 1013 to the DS or DM server 200.

The session determining module 1012 is adapted to extract session management information carried in the notification message, such as version information of the message, ID information of a message sender, purpose information of the session, and indication information of the session, in which the indication information of the session includes, but not limited to, the purpose information, importance information, time-out information, operation information, reply policy information of the session and the like. The session determining module 1012 is further adapted to process the extracted information, for example, determine whether the session is important and whether the version information of the message is correct according to the purpose of the session, perform a digest authentication according to the ID information of the sender, and other processing processes, and is adapted to determine the reply of the message according to a processing result.

The session determining module 1012 is further adapted to acquire form information of the message, for example, a format of the message, analyze the format of the message, and determine the reply of the message according to an analysis result.

The session determining module 1012 is further adapted to determine the form and the content of the reply message according to bearer form information of the notification message sent by the server side and the information acquired from the notification message.

The reply message generating module 1013 is adapted to generate the reply message according to an indication of the session determining module 1012. It should be noted that if the reply message is based on the DS or DM session, the reply message generating module 1013 is adapted to generate the DS or DM session message and send the DS or DM session message to the DS or DM server 200 through the message transceiving module 1011; if the reply message is based on the non session, in other words, the reply message is generated based on the bearer form of the notification message sent by the notification server, such as an SIP message, a short message service (SMS), a wireless application protocol (WAP) push, and an SIP push, the reply message generating module 1013 is adapted to generate the reply message with the corresponding format according to the corresponding format of the reply message (for example, the format of the reply message described in the embodiments of the present invention as follows) and according to the bearer form of the notification message sent by the notification server of the server side, and send the reply message with the corresponding format to the notification server 300 through a reply message sending module 1022 described thereafter.

On other occasions, the DS or DM client 101 may further include a policy setting module 1014, which is adapted to store the policy of determining whether to reply the message, and the detailed content of the policy may be obtained with reference to the detailed introduction related to the policy of the embodiments of the method as follows.

The session determining module 1012 is further adapted to determine whether to reply the message to the server side according to the policy set in the policy setting module 1014.

In the embodiments of the present invention, the terminal 100 further includes a notification client 102, which includes a notification message receiving module 1021 and a reply message sending module 1022. The notification message receiving module 1021 is adapted to receive the notification message sent by the notification server. The reply message sending module 1022 is adapted to send the reply message generated by the reply message generating module 1012 to the notification server. The notification message includes, but not limited to, the short message, the OTA push message, and the SIP push message etc.

In the embodiments of the system of the present invention, the server side includes a DS or DM server 200 and a notification server 300. It should be noted that the differentiation is the logic differentiation, and during the practical application, the two servers may be integrated in one DS or DM server.

The DS or DM server 200 may include a session notification message initiating module 201, a reply message receiving module 202, and a processing module 203. The session notification message initiating module 201 is adapted to request the notification message sending module 301 in the notification server 300 to send the session notification message to the DS or DM terminal 100. The reply message receiving module 202 is adapted to receive the resolved reply message based on the non session returned from the notification client 102 and sent by the reply message resolving module 303 in the notification server 300, or receive the reply message based on the session returned from the DS or DM client 101. The processing module 203 is adapted to perform the further processing according to the content carried in the received reply message. For example, when the content carried in the reply message includes one of following information indicating that the digest authentication is failed, the server ID is incorrect, the format of the message is incorrect, and the version information is incorrect, the processing module 203 corrects the corresponding error. When the content carried in the reply message includes one of the information indicating that the session is rejected and the notification message is successfully received, the processing module 203 does not sent the notification message. It should be noted that the reply message resolving module 303 in the notification server 300 may be set in the DS or DM server 200, so that the DS or DM server 200 resolves the corresponding reply message.

The notification server 300 may include a notification message sending module 301, a reply message receiving module 302, and a reply message resolving module 303. The notification message sending module 301 is adapted to send the notification message to the notification client 102, the reply message receiving module 302 is adapted to receive the reply message returned from the notification client 102 and send the reply message to the reply message resolving module 303, and the reply message resolving module 303 is adapted to resolve the notification message received by the reply message receiving module 302 from the notification client 102, and send a resolution result to the DS or DM server.

Figure 3:
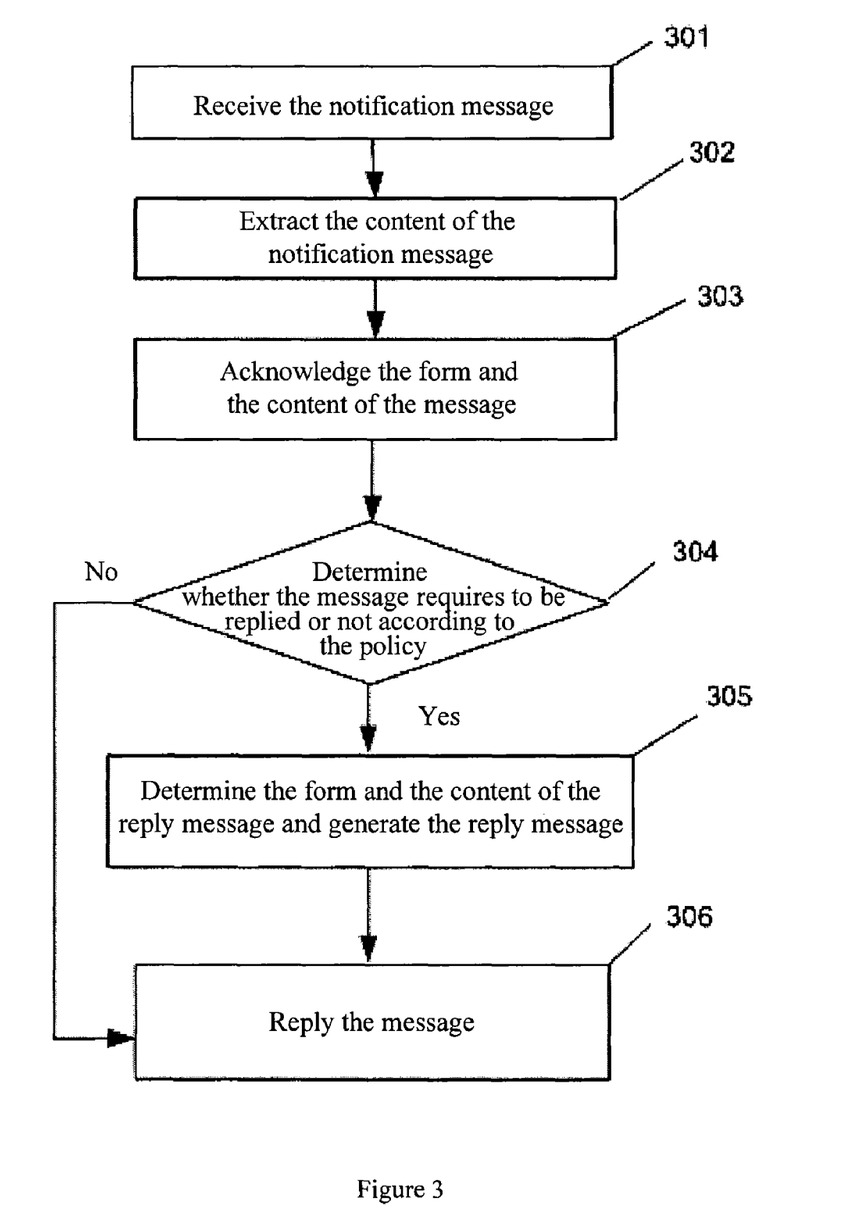
FIG. 3 is a flow chart of a method for processing a message realized based on the system of FIG. 2 provided in an embodiment of the present invention.

Based on the system mentioned above, the embodiments of the present invention further provide a method for processing the message, which is applicable to the DS or DM session. As shown in FIG. 3, a flow chart of the embodiment of the method is shown, which includes the steps as follows.

In Step 301, the notification message is received.

The DS or DM terminal receives the notification message of the DS or DM session sent by the notification server according to the request of the DS or DM server. The notification message carries session management information; for example, the session management information includes, but not limited to, ID information of the session requester, authentication information, and indication information of the session. The indication information includes, but not limited to, purpose information, importance information, time-out information, operation information, and reply policy information of the session. In the embodiments of the present invention, by expanding the DS or DM notification message, the session management information is thus included in the notification message, and the formats of the message body part of the DS or DM notification are different, so introduction is respectively given as follows.

The method for expanding the DS notification message is described as follows, and the format of the expanded DS notification is shown in Table 1 as follows.

TABLE 1

The description of the expanded fields is given as follows.

```
<response-mode> ::= <not-specified> / <response> / ; the field represents
"response mode"
        <no-response> / <user-decide>;
<not-specified> ::= "00" ; the field represents "not-specified".
<response> ::= "01" ; the field represents "response".
<no- response > ::= "10"; the field represents "no response".
<user-decide> ::= "11"; the field represents "user decide".
<importance> ::= <not-specified>/<low>/<normal>/<high>; the field
represents "importance".
<not-specified> ::= "00"; the field represents "not-specified".
<low> ::= "01"; the field represents "low".
<normal> ::= "10"; the field represents "normal".
<high> ::= "11"; the field represents "high".
<time-out> ::= 5*BIT ; the field represents "time-out period, in a unit
of day".
<future-use> ::= 18*BIT; the field represents "reserved for extension".
<length-info> ::= 8*BIT; the field represents "length of the session
information".
<info> ::= <length-info>*CHAR; the field represents "session
information".
<Op-Code> ::=3*BIT; the field represents "operation code".
```

According to <response-mode>, the server indicates to the terminal whether the reply message requires to be sent. If it is the response mode "response", it represents that the terminal requires to return whether the notification message is successfully received. If the response mode is "not-specified", the terminal may decide whether to send the reply message according to the policy. If the response mode is "no-response", the terminal requires not sending the reply message to the server. If the response mode is "user-decide", the terminal prompts the user, and the user decides whether to reply a response message.

During the practical application, if a transport layer of the notification message supports to automatically reply the successful or failure information, the server sets the response mode to be "no-response" or "not-specified". If the transport layer of the notification message does not support to automatically reply the response message, the server sets the response mode set to be "response", and an application layer replies with the response message. The detailed combination may be determined according to the situations, and the present invention is not limited to the manners.

<importance> is adapted to show the importance of the session, and the terminal decides whether the session connection with the server requires to be established according to the importance of the session. It should be noted that the importance is determined by the server, and is only adapted for the reference of the terminal. The reason is that the important session for the server may not be important for the terminal. The terminal may determine whether the session is important according to the state thereof, such as, when the terminal is busy, or the session is not important for the terminal.

<time-out> is adapted to designate the time-out period of the notification message. The notification message includes the session ID information, and the terminal initiates the session connection with the server according to the session ID information. The server requires to save the information, so as to ensure that the server understands the session connection of the terminal. If in the designate time-out period, the terminal does not initiate the session connection with the server, the server does not save the relevant information of the notification, so as to save the resource. The time-out period is in a unit of day, and if it is 0, it indicates that no time limit exists.

<length-info> is adapted to designate the length of <info> using byte as the unit. If it is 0, it indicates that the length of <info> is 0, that is, the field does not exist.

<info> is adapted to show the purpose of the notification, for example, "do you want to upgrade the firmware?" The terminal or the user determines whether to initiate the session connection with the server according to the information.

<Op-Code> is an operation code indicated by the server to the terminal. For example, the server requests the terminal to initiate an empty session, or requests the terminal to report the device information. If accepting the session, the terminal initiates the corresponding session according to the indication of <Op-Code>.

The values of <Op-Code> are as shown in Table 2 as follows.

TABLE 2

| Value | Meaning |
| --- | --- |
| 000 | The terminal is requested to initiate an empty session. |
| 001 | The terminal is requested to report the complete device information. |
| 010 | The terminal is requested to report the updated device information. |
| 011 | The terminal is requested not to report the device information. |
| 100-111 | Reserved for extension |

When the value is 000, the server requests the client to initiate an empty session. After the session is established, the server may acquire the device information of the terminal by using a <Get> command or initiate a synchronization operation.

When the value is 001, the server requests the client to report the complete device information. During the first synchronization, the client requires to report the complete device information to the server. In the subsequent synchronization, the client only requires to report the updated device information to save the traffic.

When the value is 010, the server requests the client to report the updated device information. The client may report the updated device information to the server by using a <Put> command, and the client must save an update record of the device information.

When the value is 011, the server requests the client not to report the device information. If the server is not interested in the device information of the client, or the server considers that the device information of the client is useless, the server may request the client not to report the device information, so as to save the traffic.

Next, the method for expanding the DM notification message is described as follows, and the format of the expanded DM notification is shown in Table 3 as follows.

TABLE 3

The description of the expanded fields is given as follows.

---

<num-MOs>::= 4*BIT; the field represents "the number of MOs".
<future-use>::= 4*BIT; the field represents "reserved for extension".
<MO1>::= <MOI-length><MOI>; the field represents "information of the first MOI".
<MOI-length>::= 8*BIT; the field represents "length of MOI".
<MOI>::= <MOI-length>*CHAR; the field represents "ID information of MO".
 <num-MOs> is adapted to show that how many MOs are involved in this session. The following MO1-MON are adapted to show the information of the MO in detail.
 <MOI-length> is adapted to show the length of the MOI.
 <MOI> is adapted to show the ID information of the MO.

---

The terminal may set a certain policy, and automatically determine whether to initiate the session connection with the server according to <MOI>, <Importance>, or other information. For example, if the importance level is high, the terminal automatically allows the session. If the importance level is low, the terminal automatically rejects the session. For example, if the MOI is "urn:oma:mo:fumo:1.0", the terminal also automatically allows the session.

In Step 302, the content in the notification message is extracted.

The DS or DM terminal extracts the content carried in the notification message. It should be noted that, one notification message may carry a part of the content, for example, the indication information of the session, including the importance value of the session and/or the purpose information, the operation information, the time-out information (time period of the reply) of the session, and the reply policy of the DS or DM terminal delivered by the DS or DM server etc. However, it is not required that all the information is carried in one notification message. Definitely, all the information may be carried at the same time.

In Step 303, the DS or DM terminal acknowledges the form and the content of the notification message.

The DS or DM terminal acknowledges the form and the content of the notification message, which includes, but not limited to, the processing as follows. The DS or DM terminal determines whether the format of the notification message is correct, determines whether the version of the message matches, determines whether the server ID is incorrect or whether the server ID exists, authenticates whether the digest is passed according to the authentication information, and determines the importance of the session according to the acquired importance value of the session, or determines the importance of the session according to the acquired purpose of the session and the current state of the terminal, such as whether the terminal is busy, or whether the same session is performed, or displays the acquired purpose information of the session to the user, and determines the importance of the session according to whether the user rejects the session or receives the session. The DS or DM terminal also determines whether to adopt the reply policy of the DS or DM terminal delivered by the DS or DM server to the DS or DM terminal.

In Step 304, it is determined how to reply according to the policy. If initiating the DS or DM session, the terminal initiates the DS or DM session, or does not perform any processing; otherwise, the procedure proceeds to Step 306.

The policy may be the reply policy stored by the DS or DM terminal in advance, and may also be the reply policy delivered by the DS or DM server to the DS or DM terminal. The policy of the DS or DM terminal includes, but not limited to, several situations as follows. 1. When the notification message is successfully received, in other words, it indicates that the version of the notification message is correct, the format is correct, the server ID is correct, and the digest validation is passed, and when the session is considered to be relatively important and may be received according to the indication information in the session management information and/or the current state of the terminal, the message requires to be replied. 2. When the notification message is successfully received, in other words, it indicates that the version of the notification message is correct, the format is correct, the DS or DM server ID is correct, and the digest validation is passed, and when the session is considered to be relatively important, the message requires not to be replied. 3. When the notification message is successfully received, in other words, it indicates that the version of the notification message is correct, the format is correct, the server ID is correct, and the digest validation is passed, but when the session is considered to be not important according to the indication information in the session management information and/or the current state of the terminal and the session is rejected, the message requires to be replied. 4. When the received message has one of the situations that the version of the notification message is incorrect, the format is incorrect, the DS or DM server ID is incorrect, and the digest validation is not passed, but when the session is considered to be relatively important and may be received according to the indication information in the session management information and/or the current state of the terminal, the message requires to be replied. 5. When the received message has one of the situations that the version is incorrect, the format is incorrect, the DS or DM server ID is incorrect, and the digest validation is not passed, but when the session is considered to be not important according to the indication information in the session management information and/or the current state of the terminal and the session is rejected, the message requires to be replied. During the practical application, the DS or DM terminal prompts the user, and the user decides whether to reply. If in Step 303, the terminal determines to adopt the reply policy of the DS or DM terminal delivered by the DS or DM server to the DS or DM terminal, the terminal performs the corresponding reply by adopting the reply policy delivered by the server. During the practical application, it is directly defaulted that the message requires to be replied, and the step may be omitted.

In Step 305, the form and the content of the reply message are determined, and the reply message is generated.

When it is determined that the message requires to be replied according to the Step 304, according to the different analysis and the authentication results on the message in the Step 303 and the different bearer forms of the notification message, the form and the content of the reply message are determined according to the rule described as follows.

Different forms and contents of the reply message are respectively determined according to the four situations requiring the reply.

In the first situation (the above-mentioned 1), if the notification client in the DS or DM terminal may reply the message according to the bearer form of the notification message, the notification client replies with the message to the notification server, with the content that the notification message of the server side is successfully received. The content of the reply messages are represented by the status code carried in the reply message, and the details may be obtained with reference to the embodiment of the method as follows. Otherwise, the notification client in the DS or DM terminal cannot reply the message according to the bearer form of the notification message, or although the notification client may reply the message according to the bearer form of the notification message, the ID for the reply message of the notification server does not exist, so that the message may not be replied. Here, the DS or DM client in the DS or DM terminal replies with the message, with the content that the notification message of the server side is successfully received. For example, the notification client receives the notification message sent by the notification server in the SMS manner, but no reply number of the notification server exists, so the message may not be replied. In the reply mechanism, the notification message is conveniently replied without initiating the DS or DM session for reply the message. Definitely, it may be considered that no matter whether the notification client may reply the message, it is directly determined that the DS or DM client replies with the message.

In the second situation (the above-mentioned 3), similar to the first situation, if the notification client in the DS or DM terminal may reply the message, the notification client replies with the message. Otherwise, the DS or DM client in the DS or DM terminal replies with the message, with the content that the session is rejected. Similarly, it is possible to directly determine that the DS or DM client replies with the message with the content that the session is rejected, without considering whether the notification client may reply with the message.

In the third situation (the above-mentioned 4), when the received message has one of the two situations that the DS or DM server ID is incorrect and the digest validation is not passed, the DS or DM client cannot reply the message since the DS or DM server ID is incorrect or the digest validation is not passed, and the notification client replies with the message, with the content that the DS or DM server ID is incorrect or the digest validation fails. When the received message has the situation that the version is incorrect or the format is incorrect, similar to the second situation, the notification client or the DS or DM client is selected to reply the message, with the content that the notification message is incorrect, specifically, the error type is that the version of the message is incorrect or the format of the message is incorrect.

In the fourth situation (the above-mentioned 5), when the received message has one of the two situations that the DS or DM server ID is incorrect and the digest validation is not passed, the DS or DM client cannot reply the message since the DS or DM server ID is incorrect or the digest validation is not passed, and the notification client replies with the message, with the content that the session is rejected. When the version of the received message is incorrect or the format is incorrect, similar to the second situation, the notification client or the DS or DM client is selected to reply the message, with the content that the session is rejected. The reply message is generated according to the content and the form of the reply message.

In Step 306, the DS or DM terminal replies with the message.

When the notification client in the DS or DM terminal replies with the message, the notification client packages the reply message to a specified format capable of being understood by the server, and sends the packaged message to the notification server. The detailed format may be obtained with reference to the detailed description of the relevant steps of the embodiment of the method according to the present invention.

When the DS or DM client in the DS or DM terminal replies with the message, the DS or DM client carries the corresponding content in the session message sent to the DS or DM server as the reply of the server session notification message, and the detailed carrying method may be obtained with reference to the detailed description of the relevant steps of the embodiments of the method according to the present invention.

Initiating the DS or DM session may be used as one of the reply message.

Two embodiments are given as follows, in a first embodiment, the process of replying with the message via the notification client is described, and in a second embodiment, the process of replying the message via the DS or DM client is described.

Figure 4:
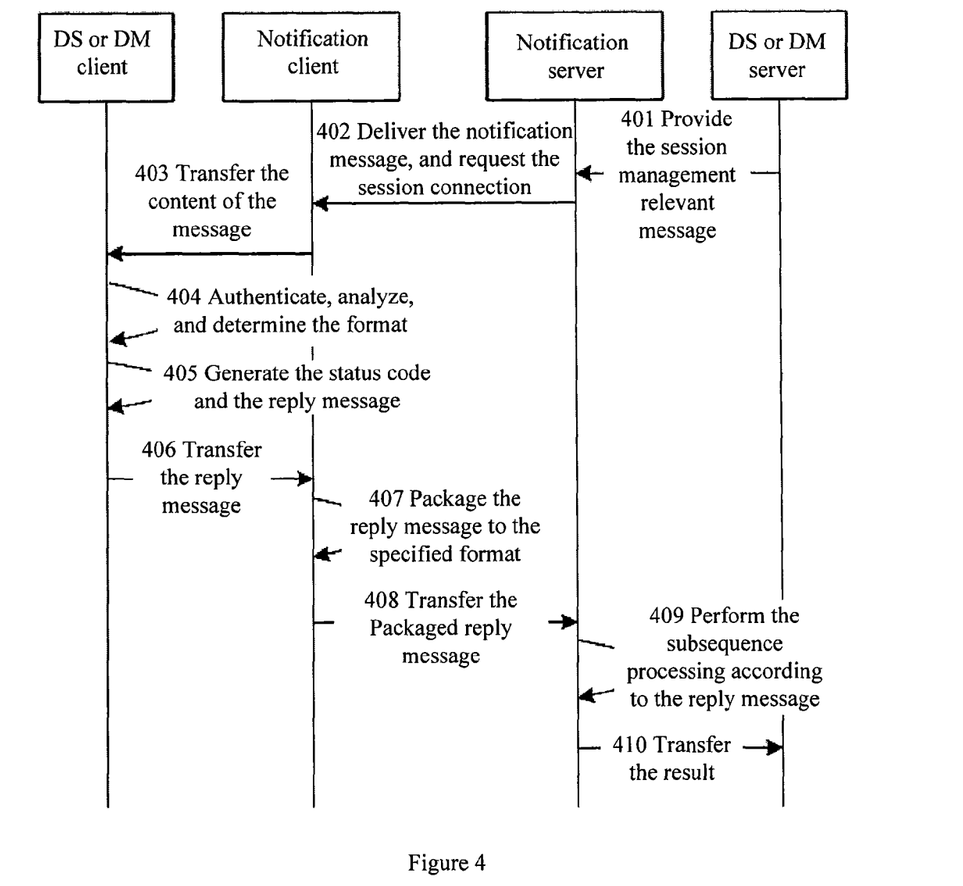
FIG. 4 is a signaling flow chart of sending a reply message to the notification server by a notification client in the DS or DM terminal provided in an embodiment of the present invention.

Referring to FIG. 4, a signaling flow chart of the first embodiment of the method according to the present invention is shown, which includes the steps as follows.

In Step 401, the DS or DM server provides the session management relevant information, and requests the notification server to deliver the notification message to the DS or DM terminal. The notification server may be implemented as a short message server, an OTA PUSH server, or an SIP PUSH server etc.

The relevant management information content is described above, so is not repeated here.

In Step 402, the notification server delivers the notification message to the DS or DM terminal, and requests the session connection. The notification message includes the session management purpose, the importance, and other information, and the delivery manner may be the short message and the OTA PUSH etc.

In Step 403, the notification client on the terminal transfers the notification message to the DS or DM client.

In Step 404, the DS or DM client in the DS or DM terminal extracts the content in the message, such as the DS or DM server ID, authenticates the digest in the notification message, analyzes the format of the message, and determines the importance of the session.

The DS or DM terminal determines whether the message requires to be replied according to the above-mentioned policy set and saved in the DS or DM terminal in advance. For example, if the DS or DM server ID is incorrect, the digest authentication fails, or the format of the notification is incorrect, the terminal replies with the corresponding error information to the server as the reply of the notification message.

If the DS or DM server ID is correct, the digest authentication is passed, or the format of the notification is correct, the terminal may reply with the corresponding information, for example, the information indicating that the terminal successfully receives the message, to the server as the reply of the notification message.

In Step 405, the DS or DM client in the DS or DM terminal generates the status code and the reply message, so as to indicate whether the notification message is successfully received.

If successfully receiving the message, the terminal replies with the 200 (successful) information, if the DS or DM server ID is incorrect, the digest authentication fails, or the format of the notification is incorrect, the terminal replies with the corresponding error code to the notification server, and the detailed corresponding table of the status code is shown in Table 5.

In Step 406, the DS or DM client transfers the reply message to the notification client.

It should be noted that before the DS or DM client determines to transfer the reply message to the notification client, it is necessary to determine to reply with the notification message according to the bearer form of the notification message and the reply number of the notification server.

In Step 407, the notification client packages the reply message to the specified format, as shown in Table 4 as follows.

In Step 408, the notification client transfers the packaged reply message to the notification server.

In Step 409, the notification server performs the subsequent processing according to the reply message.

If the status code returned from the terminal indicates that the message is successfully received, the notification server does not resend the notification message. If the status code returned from the terminal is the error code, the server regenerates the notification message according to the situation of the occurred fault, and resends the notification message to the terminal. For example, if the format is incorrect, the server checks the format of the message. If the digest is incorrect, the authentication information is reacquired to generate the digest.

In Step 410, the notification server sends a processing result to the DS or DM server.

It may be known from the above embodiment that by analyzing, determining, and authenticating the form and the content of the notification message, the problems in the message may be determined, such as, the format problem, the DS or DM server ID problem, the problem that the authentication is not passed, and the problem that the version is incorrect, or the session initiated by the server is not important. Then, the problems are carried in the reply message sent to the server, so that the server knows whether the notification message is successfully received, so as not to send the notification message; or the server corrects the relevant information when knowing that the problems of the format, the version, and the server ID exist in the message, so as to send the updated notification message on time to perform the session; or the server does not blindly resend the session message after knowing the information that the terminal rejects the session.

It should be noted that in the Step 505, the DS or DM terminal selects the bearer form according to the bearer form of the notification when being delivered, so as to bear the reply message. In addition, in order to enable the server to better understand the reply message, in the present invention, the format of the reply message is designed, as shown in Table 4 as follows.

TABLE 4 the format of the reply message of the notification

Some fields such as <version> and <sessionid> have the same meaning as in the notification message. The description of other fields is given as follows.

<status-code>::=4*BIT; the field represents "status code".

<length-authname>::=8*BIT; the field represents "length of the authentication name".

<authname>::=<length-authname>*CHAR; the field represents "authentication name".

<status-code> is used for the DS or DM server authenticating the DS or DM terminal. <status-code> is adapted to show the status code of the notification message received by the terminal, such as successful and failure. The possible status codes are as shown in Table 5 as follows.

TABLE 5

| Status Code | Meaning |
| --- | --- |
| 0000 | The terminal successfully receives the message. |
| 0001 | The Digest authentication fails. |
| 0010 | The version is not matched. |
| 0011 | The format is error. |
| 0100 | The server ID does not exist. |
| 0101 | Not-specified is error |
| 0111 | The terminal rejects the session. |
| 0110-1111 | Reserved for extension |

It should be noted that the setting of the format or the table is given as an example, and in the present invention, other similar settings are not excluded, so the present invention is not limited thereto.

In addition, in order enable the server to conveniently understand that the message sent by the terminal is the reply message of the notification, the content type of the reply message may be defined to be:

application/vnd.syncml.dm.response application/vnd.syncml.ds.response.

The server may know the situation of receiving the message by the terminal according to the received status code information.

If the DS or DM terminal cannot reply with the notification message because of the bearer form or other reasons, for example, the reply number of the notification server cannot be acquired, or the notification server delivers the notification message by the WAP PUSH, the terminal cannot reply the notification message in the WAP PUSH manner; here, the terminal may reply the message to the server in the DS or DM session manner; for example, the terminal may reply the corresponding error information of the notification server or the information indicating that the session is rejected. It should be noted that if the DS or DM terminal fails to authenticate the Digest of the notification message, or the DS or DM server ID information is found to be incorrect, the terminal does not initiate the DS or DM session to report the corresponding error information because that the server cannot be trusted. If the format of the notification is incorrect, the version is not matched, and other errors exist, the terminal may report the error information in the DS or DM session manner. When the message is replied to the server in the DS or DM session manner, Alert Type requires to be defined in the protocol to report the specified information, for example, org.openmobilealliance.dm.notification-error indicates the relevant error code in <Data>.

Figure 5:
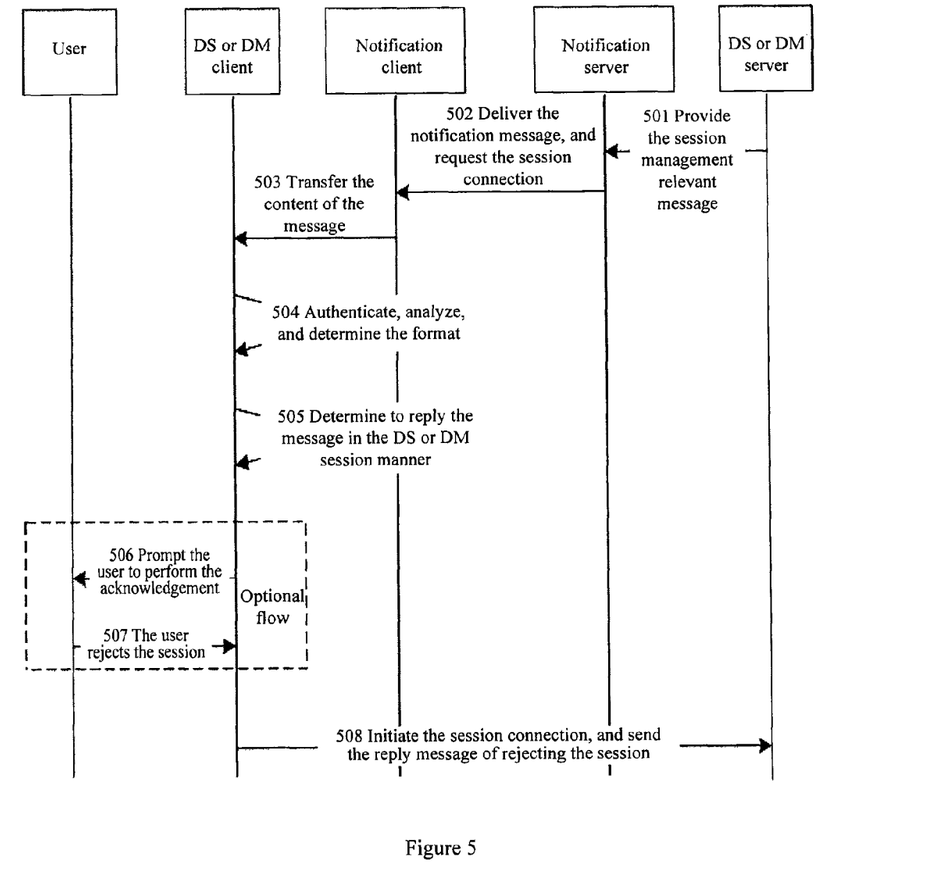
FIG. 5 is a signaling flow chart of sending the reply message to the DS or DM server by a DS or DM client in the DS or DM terminal provided in an embodiment of the present invention.

The detailed situation may be obtained with reference to FIG. 5, a signaling flow chart of replying with the message via the DS or DM client according to the second embodiment of the method according to the present invention, and the detailed process is shown as follows.

The steps are shown as follows.

In Step 501, the DS or DM server provides the session management relevant information, and requests the notification server to deliver the notification message to the DS or DM terminal. The notification server may be implemented as the short message server, the OTA PUSH server, or the SIP PUSH server etc.

The relevant management information content is described above, so is not repeated here.

In Step 502, the notification server delivers the notification message to the DS or DM terminal, and requests the session connection. The notification message includes the session management purpose, the importance, and other information, and the delivery manner may be the short message and the OTA PUSH etc.

In Step 503, the notification client on the terminal transfers the notification message to the DS or DM client.

In Step 504, the DS or DM client in the DS or DM terminal extracts the content in the message, such as the DS or DM server ID, authenticates the digest of the notification message, analyzes the format of the message, and determines the importance of the session etc.

The DS or DM terminal determines whether the message requires to be replied according to the above-mentioned policy set and saved in the DS or DM terminal in advance. For example, if the format of the notification is incorrect and the version information is incorrect, the terminal replies with the corresponding error information to the DS or DM server.

If the DS or DM server ID is correct, the digest authentication is passed, the format of the notification is correct, and the version is correct, the terminal may reply with the corresponding information, for example, the information indicating that the terminal successfully receives the message, to the DS or DM server.

If the terminal considers that the importance of the session does not satisfy the set policy, the terminal sends the reply message of rejecting the session to the DS or DM server.

In Step 506, when the DS or DM client determines that the message requires to be replied according to the corresponding policy, by acknowledging the bearer form of the notification message, the reply number of the notification server and other information, the DS or DM client determines not to reply in the form of notification, or the DS or DM client directly selects to reply with the message in the DS or DM session manner. The content of the reply message includes that the format of the message is incorrect, version of the message is incorrect, the notification message is successfully received, or the session is rejected.

Optionally, the DS or DM client may display the relevant information in the notification message for the user, and requests the user to acknowledge whether to reject the session by a user interface (UI) interface.

In Step 507, the user determines to reject the session by an input interface.

In Step 508, the DS or DM terminal initiates the session connection to the DS or DM server, and sends the reply message of rejecting the session.

Optionally, if the terminal accepts the session, the terminal initiates the corresponding session operation according to the indication in the notification message. For example, the terminal initiates an empty session or reports the device information.

In Step 508, the DS or DM terminal requires to initiate a special session to notify the server that the terminal rejects the session. An Alert type requires be defined to notify the server of the usage of the message, and the type may be defined as: org.openmobilealliance.dm.refuse-session.

The example of the message is shown as follows.

```
<Alert>; the field represents "Alert command".
   <CmdID>1</CmdID>; the field represents "sequence number ID of
   the command".
   <Data>1226</Data>; the field represents "Alert type, 1226 represents
   Generic Alert".
   <Item>; the field represents "data item".
      <Meta>; the field represents "description information of the data
      item".
      <Type xmlns="syncml:metinf">; the field represents "Item type".
      org.openmobilealliance.dm.refuse-session; the field represents "the
      session is rejected".
      </Type>
      <Format xmlns="syncml:metinf">b64</Format>; data format
      of <Data>.
      </Meta>
         <Data>abc...</Data>; the field represents "data content".
      </Item>
</Alert>
```

Or, an Alert type is separately expanded, for example, Alert 1220, which is adapted to report the information indicating that the session is rejected to the server.

The example of the message is shown as follows.

```
<Alert>; the field represents "notification command".
   <CmdID>1</CmdID>
   <Data>1220</Data>; the field represents "notification type, representing
   that the terminal rejects the session".
   <Item>  ...  </Item>
</Alert>
```

In addition, the information indicating that the format of the message is incorrect, the version of the message is incorrect, and the notification message is successfully received may be carried in the Alert element in the message.

In order to save the traffic, after receiving the reply message of rejecting the session, the DS or DM server may not reply with the message.

According to the description of the embodiment mentioned above, it may be known that the DS or DM terminal knows whether the session initiated by the DS or DM server is important in advance by the notification message, even if the notification message delivered by the server shows that the session is important, the terminal determines whether the session is important according to the state thereof. When determining that the session is not important, the terminal directly sends the reply information of rejecting the session to the server, thereby preventing the DS or DM server from repeatedly sending the notification message before being informed that the terminal initiates the session, and preventing wasting the server processing and the network resource. Therefore, the terminal knows the purpose and the importance of the session in advance, so the situation that the ongoing session is rejected when it is detected that the importance of the session does not meet the requirement is avoided, thus preventing the waste of the processing resources of the terminal and the network transmission resources.

In a third embodiment, for example, the SIP push Agent serving as the notification server sends the notification message, the method for processing the message applicable to the DS or DM session according to the present invention is further described, so that those skilled in the art may understand the solution of the present invention more clearly. In this embodiment, an SIP push sender agent is the notification server, and an SIP push receiver agent is the notification client. The Push content includes the notification message. The detailed process may be obtained with reference to FIG. 6, which includes the steps as follows.

Figure 6:
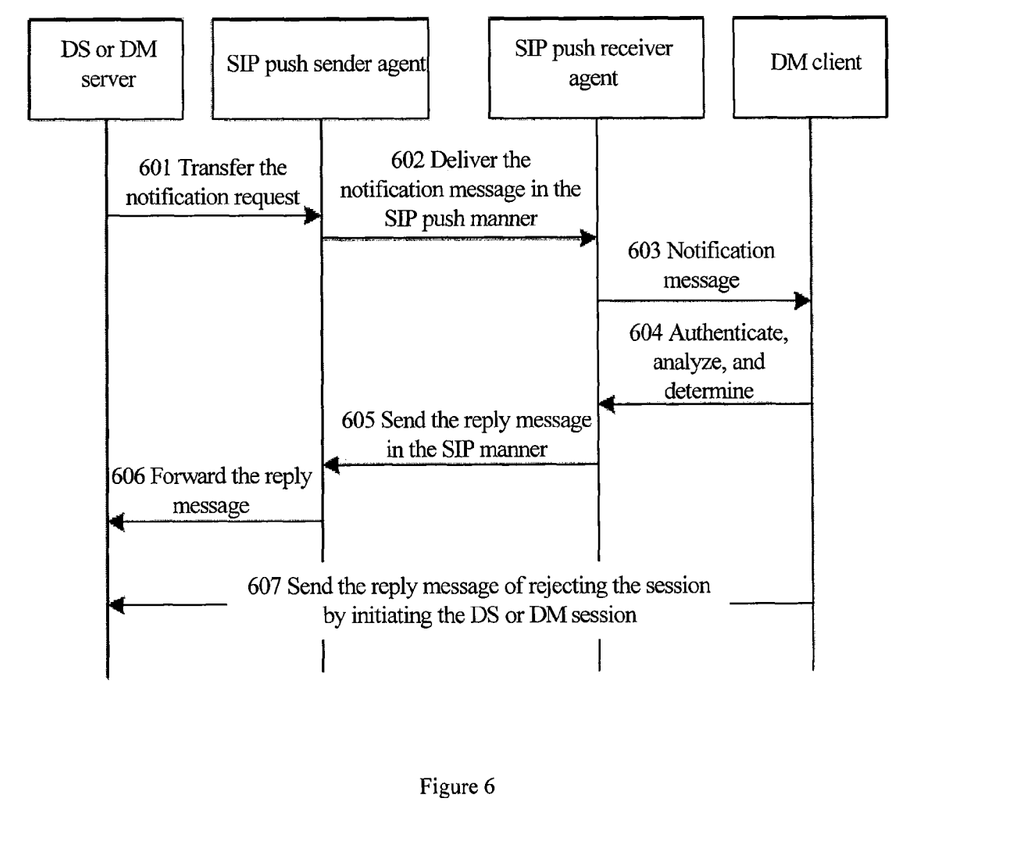
FIG. 6 is a signaling flow chart of sending the reply message to the DS or DM server by a session initiation protocol (SIP) Push message provided in an embodiment of the present invention

In Step 601, the DS or DM server transfers the notification request to the SIP push sender agent, and requests to send the notification message.

In 602, the SIP push sender agent server delivers the content of the notification to the DS or DM terminal.

The SIP push sender agent server delivers the notification message to the SIP push receiver agent (i.e., the notification client) in the DS or DM terminal by using an SIP push protocol.

The content of the digest and the message header of the notification in this embodiment are shown in Table 6 as follows.

The content of the message body part of the notification is shown in Table 7 as follows.

TABLE 7

| 00001011 | 1 | | | 00011001 | | |
|---|---|---|---|---|---|---|
| 11 bytes | 1 MO | | | 25 bytes | | |
| ↑ | ↑ | ↑ | ↑ | ↑ | | |
| length-info | info | num-MOs | future-use | MOI-length | MOI | vendor-specific |
| | ↓ | | | | ↓ | |
| | 'the session is information of collecting signal amount' | | | | 'urn:oma:mo:diagnostic:1.0' | |

The content of the notification is delivered by using the MESSAGE method in the SIP, and the example of the SIP message is given as follows.

MESSAGE sip:user@domain.com SIP/2.0
    Via: SIP/2.0/TCP serverpc.domain.com; branch=z9hG4bk776sgdkse;
    Max-Forwards: 70
    From: sip:server@domain.com;tag=49583
    To: sip:user@domain.com
    Call-ID: asd88asd77@1.2.3.4
    CSeq: 1 MESSAGE
    Content-Type: application/vnd.syncml.dm.notification
    Content-Length: ( . . . )
    [--Notification Message Goes Here!--]

In Step 603, the SIP push receiver agent sends the notification message to the DS or DM client.

The DS or DM terminal gives the response to the Push content by using the SIP, and the example of the message is given as follows.

SIP/2.0 200 OK
    Via: SIP/2.0/TCPproxy.domain.com; branch=z9hG4bk123dsghds;
    Via:SIP/2.0/TCP senderpc.domain.com; branch=z9hG4bk776sgdkse;
    From: sip: server@domain.com;tag=49394
    To: sip:user@domain.com
    Call-ID: asd88asd77@1.2.3.4
    CSeq: 1 MESSAGE
    Content-Type: application/vnd.syncml.dm.response
    Content-Length: ( . . . )
    [--Notification Respond Message Goes Here!--]

The content and the format of the reply message of the notification are shown in Table 8 as follows.

TABLE 6

| 128*bit | 10 | | 01 | | 00002 | | | 00000111 | | |
|---|---|---|---|---|---|---|---|---|---|---|
| digest | Informative | | resonse | | Two days | | | 7 bytes | | |
| ↑ | | | ↑ | | ↑ | | | ↑ | | |
| digest | version | ui-mode | initiator | response-mode | importance | time-out | future-use | sessionid | length-identifier | server-identifier |
| | ↓ | | ↓ | | ↓ | | | ↓ | | ↓ |
| | 0000001101 | | 1 | | 01 | | | 00000000 | | 'Server A' |
| | The version is 1.3. | | Server initiating | | low | | | 00000001 | | |

TABLE 8

Content of the reply message

| version | status-code | future-use | sessionid | length-authname | authname | vendor-specific |
|---------|-------------|------------|-----------|-----------------|----------|-----------------|

- version: 0000 Success → 0000001101 The version is 1.3.
- status-code: 00000101 5 bytes
- sessionid: 00000000 00000001
- authname: 'Brace'

In Step 604, the DS or DM client performs the authentication, the analysis, and the determination according to the content of the notification message, the detailed process is the same as the embodiment of the method, and the DS or DM client determines the form and the content of the reply message according to the authentication, analysis, and determination result and the corresponding policy.

For example, if it is determined to reply with the message by the SIP push receiver agent according to the above process, the procedure proceeds to Step 605. If the DS or DM terminal finds that the Importance of the session is low according to the set policy, and knows that the session is the diagnosis from the MOI and is not the required session type, the DS or DM terminal does not want to be disturbed and automatically reject the session, the procedure proceeds to Step 607.

In Step 605, the SIP push receiver agent sends the reply message to the SIP push sender agent in the SIP push sender agent server in the SIP form.

In Step 606, the SIP push sender agent server sends the reply message to the DS or DM server.

In Step 607, the DS or DM client initiates the DS or DM session to the DS or DM server, and sends the reply message for rejecting the session.

The example of the content of the session rejecting message is given as follows.

```
<Alert>; the field represents "Alert command".
  <CmdID>1</CmdID>; the field represents "sequence number ID
  of the command".
  <Data>1226</Data>; the field represents "Alert type, and 1226
represents the Generic Alert".
    <Item>; the field represents "data item".
      <Meta>; the field represents "the description information of the
      data item".
        <Type xmlns="syncml:metinf">; the field represents "Item
        type".
          org.openmobilealliance.dm.refuse-session; the
field represents "the terminal rejects the session".
        </Type>
      <Format xmlns="syncml:metinf">b64</Format> ;the field represents
"format of the <Data>".
      </Meta>
      <Data>abc... </Data>; the field represents "data content".
    </Item>
</Alert>
```

It may be known from the above embodiment that by analyzing, determining, and authenticating the form and the content of the notification message, the errors in the message may be determined, such as, the format error, the DS or DM server ID error, the error that the authentication is not passed, and the error that the version is incorrect, or the session initiated by the server is not important. Then, the problems are carried in the reply message sent to the server, so that the server knows whether the notification message is successfully received, so as not to send the notification message; or the server corrects the relevant information when knowing that the format error, the version, and the server ID exist in the message, so as to send the updated notification message on time to perform the session; or the server does not blindly resend the session message after knowing the information that the terminal rejects the session. Further, the DS or DM terminal knows in advance whether the session initiated by the DS or DM server is important by the notification message, even if the notification message delivered by the server shows that the session is important, the terminal determines whether the session is important according to the state thereof. When determining that the session is not important, the terminal directly sends the reply information of rejecting the session to the server, thereby preventing the DS or DM server from repeatedly sending the notification message before receiving session initialization from the terminal, and preventing wasting the server processing and the network resource. Or, the terminal knows the purpose and the importance of the session in advance, so that the situation that the ongoing session is rejected when it is detected that the importance of the session does not meet the requirement is avoided, thus preventing the waste of the processing resources of the terminal and the network transmission resources.

According to the description of the implementation manner mentioned above, those skilled in the art may clearly know that the present invention may be realized by using the software and the necessary universal hardware platform, and definitely may be realized by using the hardware, but under most of the situations, the former one is much more preferred. Based on this understanding, the technical solution of the present invention is substantially or the parts contributing to the prior art may be realized in the software product form. The computer software product is stored in a readable storage medium, such as a floppy disk, a hard disk, or an optical disk of the computer, and includes several instructions for enabling a computer device (a personal computer, a server, or a network device) to execute the method according to each embodiment of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing a message, applicable to a Data Synchronization (DS) or Device Management (DM) session, comprising:

receiving, by a terminal device, a notification message for requesting to establish a session sent by a server, wherein the notification message carries session management information related to the session, wherein the session management information comprises identifier (ID) information of the server, authentication information, and indication information of the session, and wherein the indication information of the session comprises at least one of purpose information, importance information, time-out information, operation information, or reply policy information of the session;

acquiring, by the terminal device, the session management information related to the session in the notification message; and initiating, by the terminal device, a session connection with the server according to the session management information or acknowledging, by the terminal device, the notification message according to the session management information, generating a reply message according to an acknowledgement result, and sending the reply message to the server.

2. The method according to claim 1 wherein before the generating the reply message according to the acknowledgement result, the method further comprises:

determining, by the terminal device, whether to require replying with the notification message, and generating the reply message according to the acknowledgement result if the notification message requires to be replied.

3. The method according to claim 1, wherein before the generating the reply message according to the acknowledgement result, the method further comprises:

determining, by the terminal device, a form of the reply message.

4. The method according to claim 3, wherein the form of the reply message comprises:

using a bearer form of the notification message as a bearer form of the reply message, and/or replying with the notification message in a form of a DS or DM session message.

5. The method according to claim 4, wherein the reply message carries one of:

information indicating that the notification message is successfully received, error information of the notification message, information indicating that the session is rejected, and information indicating that the session is accepted.

6. The method according to claim 5, wherein the error information of the notification message comprises one of the information indicating that:

the ID information of the server in the notification message is incorrect or does not exist;

the format of the notification message is incorrect;

the authentication on the authentication information of the notification message in the notification message fails; and the notification message exceeds a validity period.

7. The method according to claim 6, further comprising:

performing, by the server, a corresponding processing according to the content carried in the received reply message, wherein the performing the corresponding processing comprises:

modifying the notification message correspondingly according to an error type of the error information, and resending a modified notification message; or not resending the notification message according to information of receiving the notification message successfully by a terminal device or information of rejecting the session by the terminal device.

8. The method according to claim 1, wherein the acknowledging the notification message according to the session management information comprises:

determining whether a format of the notification message is correct;

determining whether the ID information of the server is valid;

performing an identity authentication on the server according to the authentication information in the notification message; and determining whether to accept the session according to the indication information of the session.

9. The method according to claim 1, wherein the purpose information is adapted to show the purpose of the notification, the importance information is adapted to show the importance of the session, the time-out information is adapted to designate the time-out period of the notification message, the operation information is an operation code indicated by the server to the terminal, and the reply policy information is adapted to indicate to the terminal whether the reply message is required to be sent.

10. A Data Synchronization (DS) or Device Management (DM) terminal device, comprising:

a notification message receiving module, adapted to receive a notification message sent by a server, wherein the notification message carries session management information, wherein the session management information comprises identifier (ID) information of the server, authentication information, and indication information of the session, and wherein the indication information of the session comprises at least one of purpose information, importance information, time-out information, operation information, or reply policy information of the session;

a session determining module, adapted to acquire the session management information, and acknowledge the notification message according to the session management information;

a reply message generating module, adapted to generate a reply message according to an acknowledgement result of the session determining module; and a message transceiving module, adapted to send the reply message generated by the reply message generating module to a server, or adapted to initiate a session connection with the server according to the acknowledgement result of the session determining module.

11. The DS or DM terminal device according to claim 10, wherein the session determining module is further adapted to determine a form of the reply message according to a bearer form of the notification message sent by the server;

the message transceiving module is further adapted to send the reply message to the server in a DS or DM session message form according to the acknowledgement result of the session determining module; and the terminal device further comprises a reply message sending module, adapted to send the reply message to the server in the bearer form of the notification message according to the acknowledgement result of the session determining module.

12. The DS or DM terminal device according to claim 11, further comprising:
a policy setting module, adapted to set a reply policy of the notification message, wherein the session determining module determines whether to require replying with the notification message or not according to the reply policy, and instructs the reply message generating module to generate the reply message when determining to require replying with the notification message.

13. The DS or DM terminal device according to claim 11, wherein the session determining module is further adapted to acknowledge whether identifier (ID) information of the server is correct according to the ID information of the server in the session management information, authenticate authentication information in the notification message according to the correct ID information of the server, and determine an importance of the session according to indication information of the session in the session management information.

14. The DS or DM terminal device according to claim 13, wherein the reply message generating module is further adapted to carry the ID error information of the server and/or authentication failure information acknowledged by the session determining module in the generated reply message; or carry rejection information of the session acknowledged by the session determining module according to the indication information of the session in the generated reply message.

15. A system for processing a message, applicable to a Data Synchronization (DS) or Device Management (DM) session, comprising: a DS or DM server, wherein the DS or DM server comprises:
a session notification message initiating module, adapted to send a notification message for requesting to establish a session to a DS or DM terminal device, wherein the notification message carries session management information related to the session, wherein the session management information comprises identifier (ID) information of the DS or DM server, authentication information, and indication information of the session, and wherein the indication information of the session comprises at least one of purpose information, importance information, time-out information, operation information, or reply policy information of the session;
a reply message receiving module, adapted to receive a reply message returned from the DS or DM terminal device; and
a processing module, adapted to perform a corresponding processing according to content carried in the reply message; wherein the system further comprising:
a terminal device, adapted to receive the notification message for requesting to establish the session, acquire the session management information related to the session in the notification message, acknowledge the notification message according to the session management information, generate the reply message according to an acknowledgement result, and send the reply message to the DS or DM server.

16. The system according to claim 15, wherein the reply message received by the reply message receiving module carries one of notification message error information, information indicating that the terminal device successfully receives the notification message, and information indicating that the terminal device rejects the session; and
the processing module is further adapted to correspondingly modify the notification message according to an error type in the notification message error information and resend the modified notification message, or not to resend the notification message according to the information indicating that the terminal device successfully receives the notification message or rejects the session.

17. The system according to claim 16, wherein the terminal device comprises:
a notification message receiving module, adapted to receive the notification message sent by a server, wherein the notification message carries the session management information;
a session determining module, adapted to acquire the session management information, and acknowledge the notification message according to the session management information;
a reply message generating module, adapted to generate the reply message according to the acknowledgement result of the session determining module; and
a message transceiving module, adapted to send the reply message generated by the reply message generating module to the server, or adapted to initiate a session connection with the server according to the acknowledgement result of the session determining module.

18. The system according to claim 17, wherein the session determining module is further adapted to determine a form of the reply message according to a bearer form of the notification message sent by the server;
the message transceiving module is further adapted to send the reply message to the server in a DS or DM session message form according to the acknowledgement result of the session determining module; and
the terminal device further comprises a reply message sending module, adapted to send the reply message to the server in the bearer form of the notification message according to the acknowledgement result of the session determining module.

19. The system according to claim 18, further comprising:
a notification message sending module, adapted to send the notification message for requesting to establish the session to the terminal device according to an indication of the DS or DM server;
a reply message receiving module, adapted to receive the reply message sent in the bearer form of the notification message; and
a reply message resolving module, adapted to receive the reply message sent by the reply message receiving module, resolve the reply message, and send a resolution result to the DS or DM server.

* * * * *